Patented Sept. 15, 1942

2,295,753

UNITED STATES PATENT OFFICE 2,295,753

ANTIOXIDANT

Philip T. Paul, Naugatuck, Conn., assignor to United States Rubber Company, New York, N. Y., a corporation of New Jersey No Drawing. Application June 28, 1939, Serial No. 281,528

8 Claims. (Cl. 260—808)

This invention relates to a new class of antioxidants or age-resisters for organic substances which tend to deteriorate by absorption of oxygen from the air, e. g. rubber or allied gums, unsaturated fatty oils, such as unsaturated vegetable oils, essential oils, petroleum oils and their derivatives such as gasolines, soaps, aldehydes, synthetic resins, turpentine, insecticides such as Derris Root, Cube Root and pyrethrum, and the like. The materials are exceptionally useful as flex-improvers or anti-flex cracking agents for vulcanized rubber, such as tire treads, which undergo repeated strains during use.

According to the invention the organic substance is incorporated with the thermal reaction product of a secondary aromatic amino compound containing at least one alkenyl group linked to a nuclear carbon atom by oxygen. The general formula is

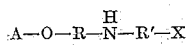

wherein R and R' are each an aromatic nucleus of the benzene, naphthalene or biphenyl series, singly bonded to O and N, and N and X, respectively. A is an alkenyl group; X is H or an alkenyloxy group; N, H, and O represent nitrogen, hydrogen, and oxygen, respectively. R and R' may also contain substituents such as halogen, hydroxy, aryloxy, alkyl, alkoxy, aryl, aralkoxy, secondary alkyl amino, tertiary alkylamino, alkenyl, anilino, mercapto, alkyl mercapto, etc. In either or both A and X, the alkenyl group may be further substituted with maintenance of the unsaturated bond, as by halogen, amino, hydroxyl, secondary or tertiary amino, mercapto, alkoxy, aryloxy, aralkoxy, etc.

Exemplary of such chemicals which are heat treated prior to incorporation as an antioxidant, are the following:

2-allyloxy diphenylamine
3-allyloxy diphenylamine
4-allyloxy diphenylamine
2-vinyloxy diphenylamine
3-vinyloxy diphenylamine
4-vinyloxy diphenylamine
2-methallyloxy diphenylamine
3-methallyloxy diphenylamine
4-methallyloxy diphenylamine
Di-allyloxy diphenylamine
Di-vinyloxy diphenylamine
Di-metallyloxy diphenylamine
4-crotyloxy diphenylamine
4-isocrotyloxy diphenylamine
4-methylvinyl carbinyloxy diphenyamine
4-ethoxy 4'-vinyloxy diphenylamine
4-phenyl 4'-allyloxy diphenylamine
4-methyl 4'-methallyloxy diphenylamine
4-anilino 4'-methallyloxy diphenylamine
4-methyl phenyl amino 4'-methallyloxy diphenylamine
4-allyloxy phenyl alpha naphthylamine
4-allyloxy phenyl beta naphthylamine
4-allyloxy 5,5-dimethyl acridan
4-methallyloxy thiodiphenylamine The alkenyl oxy substituted diaryl amino compounds may be first prepared by reacting a C-hydroxy diarylamino compound in alkaline solution with an alkenyl chloride.

The alkenyloxy substituted secondary aromatic amino compounds or mixtures thereof, thereafter, according to the present invention, may be heated at various elevated temperatures and for various durations of time, preferred temperatures being from about 150° C. to about 300° C. The temperature and time of the thermal reaction may be reduced by employing various catalysts, inorganic or organic, such as sulfuric, phosphoric, hydrochloric, benzoic, etc. acids; salts such as pyridine hydrochloride, ammonium chloride, sodium carbonate, or bases such as diethyl aniline, trimethylamine, may also be employed. The resulting products range from oily to resinous character, the starting materials being of crystalline nature. For example, 4-methallyloxy diphenylamine (M. P. 72-73° C.) when heated in a sealed tube for 15 hours at 210° C. gives an oil.

The effectiveness of chemicals of this class for retarding the deterioration of rubber is illustrated by the results of standard aging tests on commercial rubber compounds. For example, tests were made on the following tread compound (parts are by weight):

*Master batch*

| | |
|---|---:|
| Smoked sheets | 100 |
| Carbon black | 45 |
| Zinc oxide | 5 |
| Pine tar | 3.50 |
| Zinc salt of cocoanut oil acids | 3.50 |
| Sulfur | 3.00 |
| Mercaptobenzothiazole | 1.00 |
| | 161.00 |

To this master batch, the heat reaction products of several alkenyloxy diarylamines were added in the proportion of one part to 100 parts of rubber. Cures were made for 45, 60, 75 and 90 minutes at 30 pounds steam. The percent remaining tensile on the resultant mixes before and after aging 96 hours under 300 pounds oxygen at 70° C. are as follows:

|        | Control | Chemical I |
|--------|---------|------------|
| Unaged | 100     | 100        |
| Aged   | 26      | 66         |

|        | Control | Chemical II |
|--------|---------|-------------|
| Unaged | 100     | 100         |
| Aged   | 26      | 67          |

|        | Control | Chemical III |
|--------|---------|--------------|
| Unaged | 100     | 100          |
| Aged   | 26      | 64           |

Chemical I—Heat treated 4-allyloxy diphenylamine

Chemical II—Heat treated 4-methallyloxy diphenylamine

Chemical III—Heat treated mixture of 4-crotyloxy diphenylamine and 4-methyl vinyl carbinyl oxy diphenylamine.

It is to be understood that the invention may be applied to the preservation of natural rubber compositions as well as artificially-prepared rubber compositions including reclaimed rubbers, and latices of such rubber compositions.

It is also to be understood that other desired filling and compounding ingredients may be incorporated along with the preservative, for example, in the case of rubber, there may be incorporated other accelerators, softeners, etc.

The antioxidant may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the anti-oxidant may vary from about 0.1% to 5%, although either smaller or greater proportions may be found useful. If the material to which it is added is a liquid such as rubber cement or an oil, the antioxidant may be dissolved therein in a suitable small proportion. The antioxidant may be incorporated into solid substances by milling or mastication, and prepared for incorporation into dispersions or solutions either in powder, paste or solution form, or applied in such forms for incorporation by diffusion, to the surfaces of vulcanized or unvulcanized rubber goods.

Having thus described my invention, what I claim and desire to protect by Letters Patent is:

1. A method of retarding the deterioration of an organic substance which tends to deteriorate by absorption of oxygen from the air which comprises incorporating therein an antioxidant which is an oily to resinous thermal reaction product of a secondary di-aromatic amino compound containing at least one alkenyl group linked to a nuclear carbon atom by oxygen, the aromatic groups being selected from the class consisting of the benzene, naphthalene, and biphenyl series, and said thermal product being produced by pyrolysis at a temperature between 150° C. and 300° C.

2. A method of retarding the deterioration of an organic substance which tends to deteriorate by absorption of oxygen from the air which comprises incorporating therein an anti-oxidant which is an oily thermal reaction product of para allyloxy substituted diarylamine having a secondary amino nitrogen atom between the two aryl groups, the aryl groups being selected from the class consisting of the benzeze, naphthalene, and biphenyl series, and said thermal product being produced by pyrolysis at a temperature between 150° C. and 300° C.

3. A method of preserving rubber which comprises incorporating therein a thermal reaction product of a C-alkenyloxy substituted diphenylamine, said thermal product being produced by pyrolysis at a temperature between 150° C. and 300° C.

4. A method of preserving rubber which comprises incorporating therein a thermal reaction product of a C-allyloxy substituted diphenylamine, said thermal product being produced by pyrolysis at a temperature between 150° C. and 300° C.

5. A method of preserving rubber which comprises incorporating therein a thermal reaction product of 4-allyloxy diphenylamine, said thermal product being produced by pyrolysis at a temperature between 150° C. and 300° C.

6. A method of preserving rubber which comprises incorporating therein a thermal reaction product of 4-methallyloxy diphenylamine, said thermal product being produced by pyrolysis at a temperature between 150° C. and 300° C.

7. A method of preserving rubber which comprises incorporating therein a thermal reaction product of a mixture of 4-crotyloxy diphenylamine and 4-methyl-vinyl carbinyloxy diphenylamine, said thermal product being produced by pyrolysis at a temperature between 150° C. and 300° C.

8. The vulcanization product of a rubber composition containing a thermal reaction product of a secondary di-aromatic amino compound containing at least one alkenyl group linked to a nuclear carbon atom by oxygen, the aromatic groups being selected from the class consisting of the benzene, naphthalene, and biphenyl series, and said thermal product being produced by pyrolysis at a temperature between 150° C. and 300° C.

PHILIP T. PAUL.